P. FRANTZ.
CAR DOOR WEATHER STRIP CONSTRUCTION.
APPLICATION FILED SEPT. 18, 1915.
1,228,548.
Patented June 5, 1917.
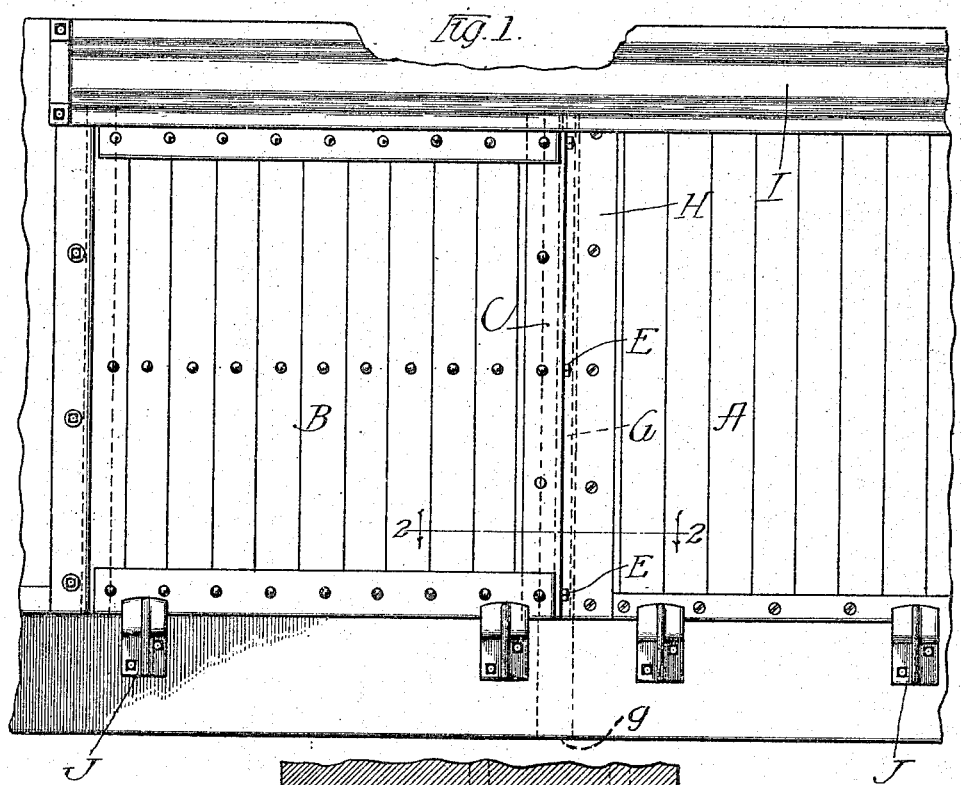
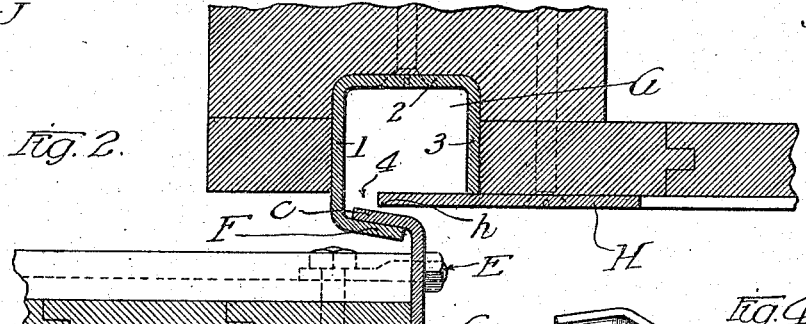
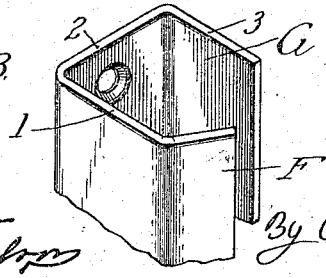
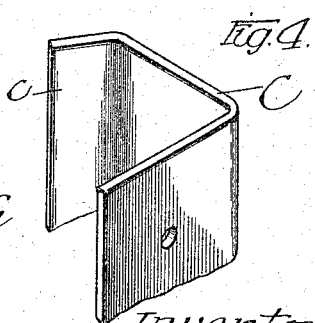
Witnesses:
Robert H. Weir
Arthur W. Carlon
Inventor
Peter Frantz
By Arthur F. Durand
Atty.

UNITED STATES PATENT OFFICE.

PETER FRANTZ, OF STERLING, ILLINOIS, ASSIGNOR TO FRANTZ MANUFACTURING CO., OF STERLING, ILLINOIS, A CORPORATION OF ILLINOIS.

CAR-DOOR WEATHER-STRIP CONSTRUCTION.

1,228,548.

Specification of Letters Patent. Patented June 5, 1917.

Application filed September 18, 1915. Serial No. 51,315.

*To all whom it may concern:*

Be it known that I, PETER FRANTZ, a citizen of the United States of America, and resident of 309 Ninth avenue, Sterling, Whiteside county, Illinois, where I am now living and receive mail, have invented a certain new and useful Improvement in Car-Door Weather-Strip Constructions, of which the following is a specification.

My invention relates to car doors of that kind in which the rear edge of the door is tightly sealed by weather strips when the door is closed. In practice, it has been found that in a driving rain storm the water will often enter between the strips on the door and car, even though the two strips be brought tightly together. This is especially true in a strong wind, for in such case the water is driven with considerable force into the crevice between the rear edge of the door and the car. In such case the wind pressure simply forces the water between the two weather strips.

The object of my invention is, therefore, to provide an improved construction and arrangement in which the water may easily escape downward through a vertical passage adjacent the rear edge of the door, instead of being forced between the two weather strips, and whereby even in a dashing rain storm and with a heavy wind pressure the water will not be driven behind the rear edge of the door and into the car.

To the foregoing and other useful ends my invention consists in matters hereinafter set forth and claimed.

In the accompanying drawings—

Figure 1 is a side elevation of a portion of a car body, showing a car door and the doorway provided, at the rear edge of the door, with a self-draining weather strip construction embodying the principles of my invention.

Fig. 2 is an enlarged detail section on line 2—2 in Fig. 1.

Fig. 3 is a perspective of the upper end portion of the combined weather strip and drainage passage lining which is secured in place at one side of the doorway.

Fig. 4 is a perspective of the upper end portion of the sheet metal weather strip which is secured to the rear edge of the door.

As thus illustrated, my invention comprises a car body A of any suitable known or approved construction, having an opening in the side thereof to form a doorway which is closed by the sliding door B, the latter being also of any suitable form or construction. The rear edge of this door is provided with a sheet metal weather strip C held in place by bolts D and E, in any suitable manner, and provided at its inner edge with a flange or engaging portion $c$, this flange being spaced a distance from the inner surface of the door. The door frame adjacent the rear edge of the door, when the latter is closed, is provided with a vertically extending weather strip F which engages the inner surface of the portion $c$, and which is formed integral with the body walls 1, 2 and 3, said walls forming a vertically extending passage G which extends from the top of the doorway downward to a point where it has a discharge opening $g$ at the bottom of the car body. A plate H is secured to the side of the car and forms the outer or front wall of the vertical passage G, the slot 4 between the edge of this plate and the inner surface of the wall 1 leaving said passage sufficiently open at its outer side to receive the water which, in a driving rain storm, would be driven between the edge $h$ of said plate and the adjacent surface of the flange $c$ when the door is closed. In other words, the passage G serves as a sort of downspout or drainage channel for the water which may be driven by a strong wind into the crevice at the rear edge of the door. Therefore, the water will escape readily downward and pass out at the bottom of the car, instead of being driven or forced by the wind between the two weather strips and into the car.

Preferably, as stated, the passage G is formed by a trough-like body of sheet metal which is integral with the strip F, and which is suitably fastened within the structure of the car, the latter being grooved or channeled vertically, if desired, in order to receive the substantially square sheet metal tube thus formed. It will be understood, however, that the said drainage passage or downspout G can be formed in any suitable manner, and that the weather strip F can be formed either separately or integral therewith. In fact, the drainage channel or vertical passage can be obtained in various ways, without departing from the scope and spirit of my invention, and for this reason I do not limit myself to the exact construction shown and described.

It will be understood that the door B can be supported at its upper edge by a track I and hangers (not shown) of any suitable character, so that the door will slide readily back and forth in the usual and well known manner. A stop of any suitable character can be provided for the front edge of the door, in order to reduce the impact on the weather strips C and F when the door is closed, and guides J can be mounted on the car body to engage and guide the lower edge of the door in the usual and well known manner.

From the foregoing it will be seen that by my invention I provide a weather strip construction for tightly sealing the rear edge of the door, when the latter is closed, and means in conjunction therewith for taking the water away from the engaging portions of the weather strips and allowing it to escape downward, thereby preventing rain from entering the car at the rear of the door while the car is traveling along in a heavy rain and wind storm.

What I claim as my invention is:—

1. In a car door weather-strip construction for tightly sealing the rear edge of the door, when the door slides forward into closed position, a vertical strip on the car body, means on said door to engage said strip, and a vertical drain passage in the side of said body adjacent said strip, said means extending vertically between said passage and said door, the outer side of said passage having a vertical slot to admit rain and thereby prevent the water from entering between said strip and means, said strip having an integral body portion forming, in effect, a vertical tube which constitutes a lining for said passage, which tube is embedded in the side of the car.

2. In a car door weather-strip construction for tightly sealing the rear edge of the door, when the door slides forward into closed position, a vertical strip on the car body, means on said door to engage said strip, and a vertical drain passage in the side of said body adjacent said strip, the outer side of said passage being open to receive rain and thereby prevent the water from entering between said strip and means, said body having a plate extending over said passage, and the edge of said plate being immediately behind said strip, there being an entrance space between said edge and means.

3. In a car door weather-strip construction for tightly sealing the rear edge of the door, when the door slides forward into closed position, a weather strip on the door, and a sheet-metal tube extending vertically in the side of the car body, said tube having its side which faces outward away from the car body provided with a vertical slot, and said tube having a vertical flange on one edge immediately outside of said slot, so that said strip tightly engages the inside surface of said flange when the door is closed, with space between said strip and the other edge of said slot to admit rain to the interior of said tube and said engaging surface of the flange being a continuation of the inside surface of the tube.

4. In a car door weather-strip construction for tightly sealing the rear edge of the door, when the door slides forward into closed position, a weather strip on the door, a sheet-metal tube extending vertically in the side of the car body, said tube having its side which faces outward away from the car body provided with a vertical slot, and said tube having a vertical flange on one edge immediately outside of said slot, so that said strip tightly engages the inner surface of said flange, with space between said strip and the other edge of said slot to admit rain to the interior of said tube, and a plate secured to the car body and extending in front of said tube and forming said other edge of said slot, said plate projecting beyond the edge of said flange.

Signed by me at Sterling, Illinois, this 7th day of Sept., 1915.

PETER FRANTZ.

Witnesses:
 CHAS. W. LEASE,
 J. W. WENTSEL.